United States Patent [19]

Wood

[11] 4,382,176
[45] May 3, 1983

[54] TEMPERATURE CONTROL ARRANGEMENT FOR AN ELECTRICAL HEATING APPLIANCE

[75] Inventor: Paul A. P. Wood, Richmond, England

[73] Assignee: PIFCO Limited, Manchester, England

[21] Appl. No.: 249,590

[22] Filed: Mar. 31, 1981

[30] Foreign Application Priority Data

Apr. 1, 1980 [GB] United Kingdom ............... 8010875
Apr. 24, 1980 [GB] United Kingdom ............... 8013549

[51] Int. Cl.³ ........................................ H05B 1/02
[52] U.S. Cl. ................................ 219/494; 219/328; 219/441; 219/512
[58] Field of Search ............... 219/328, 330, 437, 438, 219/439, 441, 442, 494, 510, 512; 99/281

[56] References Cited

U.S. PATENT DOCUMENTS 3,026,402  3/1962  Russell ............................ 219/441
3,539,774  11/1970  Thornton ......................... 219/442
3,784,788  1/1974  Fourny ............................ 219/441

FOREIGN PATENT DOCUMENTS 519778  12/1955  Canada ............................ 219/441

Primary Examiner—Volodymyr Y. Mayewsky
Attorney, Agent, or Firm—Sughrue, Mion, Zinn, Macpeak & Seas

[57] ABSTRACT

A temperature control arrangement for an electrical appliance comprises means for the attachment of the arrangement to the appliance and for the connection of the arrangement to an electricity supply whereby the appliance is supplied with electricity via the arrangement. A thermostat arrangement is provided in the arrangement and comprises a switch operable by a heat sensitive actuator. Heat transfer means are also provided whereby when the arrangement is connected to said appliance transfer of heat can take place from the appliance to the actuator so that, in use, on attainment of a predetermined temperature the actuator acts to operate the switch and affect the supply of electricity received by the appliance.

8 Claims, 5 Drawing Figures

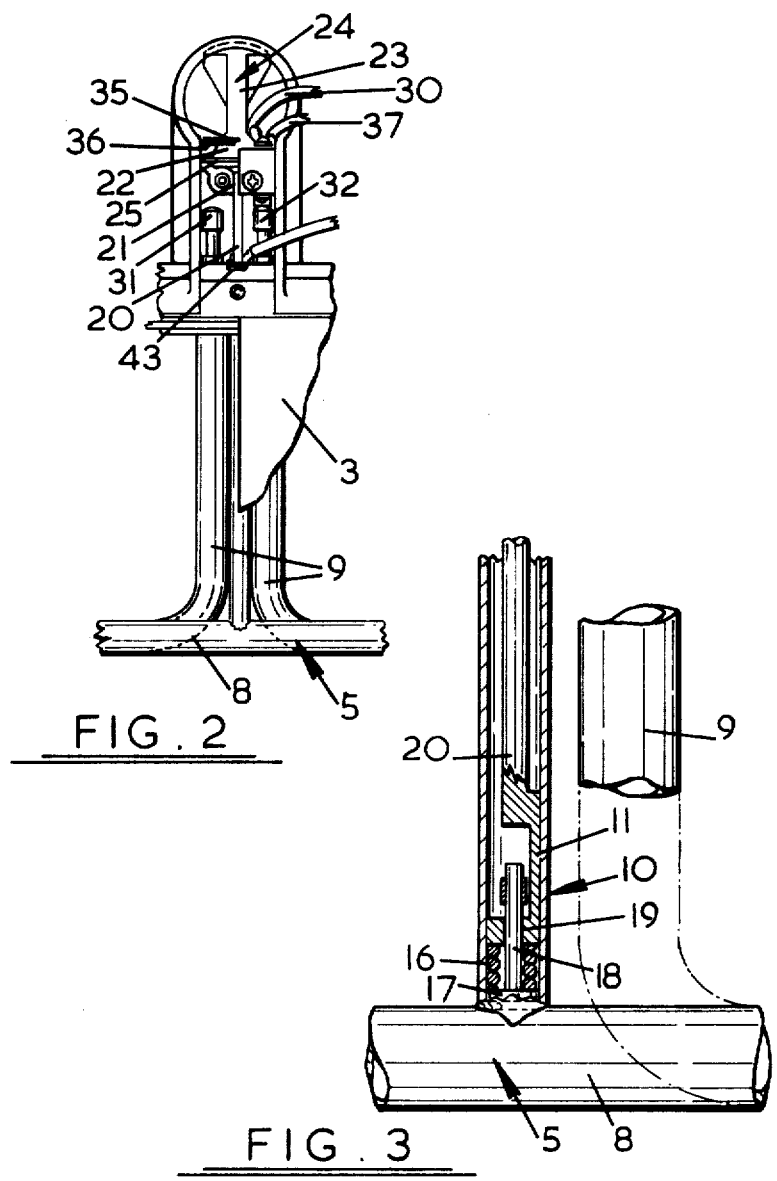

TEMPERATURE CONTROL ARRANGEMENT FOR AN ELECTRICAL HEATING APPLIANCE

The present invention relates to a temperature control arrangement for an electrical heating appliance.

By the term "electrical heating appliance" is meant not only appliances for heating per se but also appliances such as electric kettles, coffee percolators, and electric saucepans and the like which involve the use of heat to perform a given operation.

Conventional electrical heating appliances such as those mentioned above usually include a thermostat or electrical cut-out arrangement in their construction whereby the appliance itself or the medium to be heated can be prevented from overheating or continuing to be heated after a predetermined temperature has been reached.

The object of the present invention is to provide a separate temperature control arrangement for an electrical appliance, which arrangement does not form part of the construction of the appliance per se.

According to the present invention there is provided a temperature control arrangement for an electrical appliance comprising means for the attachment of the arrangement to said appliance and for the connection of the arrangement to an electricity supply whereby the appliance is supplied with electricity via the arrangement, characterised in that the arrangement comprises a thermostat arrangement in which a switch is operable by a heat sensitive actuator, and heat transfer means whereby when the arrangement is connected to said appliance transfer of heat can take place from the appliance to the actuator so that in use, on attainment of a predetermined temperature the actuator acts to operate the switch and affect the supply of electricity received by the appliance.

Preferably, the actuator comprises a shape memory effect actuator adapted to operate at a predetermined temperature.

A shape memory effect actuator comprises a material which can undergo a thermoelastic martensite transformation as the temperature of the material is raised through the transformation point. Such an actuator is produced by shaping the aforesaid material into a required shape by the application of a macroscopic deformation to the material in its fully martensitic state so that the material is strained beyond its elastic limit and is thereby permanently deformed. On heating, the reverse transformation takes place with removal of the macroscopic deformation. Hence, on heating the material returns to the shape which it had before the macroscopic deformation took place and can be described as having a "shape memory". When the material cools, it reverts back to the shape it had after the initial macroscopic deformation. The advantage of using such a shape memory effect actuator is that the temperature at which the memory effect transformation occurs can be predetermined with accuracy and does not drift with time.

Preferably also, the actuator also acts to operate a visual or audio alarm arrangement such as a light or bleeper or whistle arrangement.

The advantage of a separate temperature control arrangement according to the present invention is that it isolates the electrical controls away from the appliance which can be safer in some cases and can make electrical repair work cheaper and easier to carry out. Additionally, with a range of appliances adapted to operate with such a temperature control arrangement, a single such arrangement could be employed for use with all the appliances. Alternatively, a range of different control arrangements of varying degrees of sophistication could be made available for a single standard appliance at a varying cost to the customer.

The present invention will now be described by way of example for use with an electric kettle and with reference to the accompanying drawings, in which:

FIG. 2 is a partially cut-away side view of a portion of FIG. 1;

FIG. 3 is an enlargement of a portion of FIG. 2; and

Figure 1:
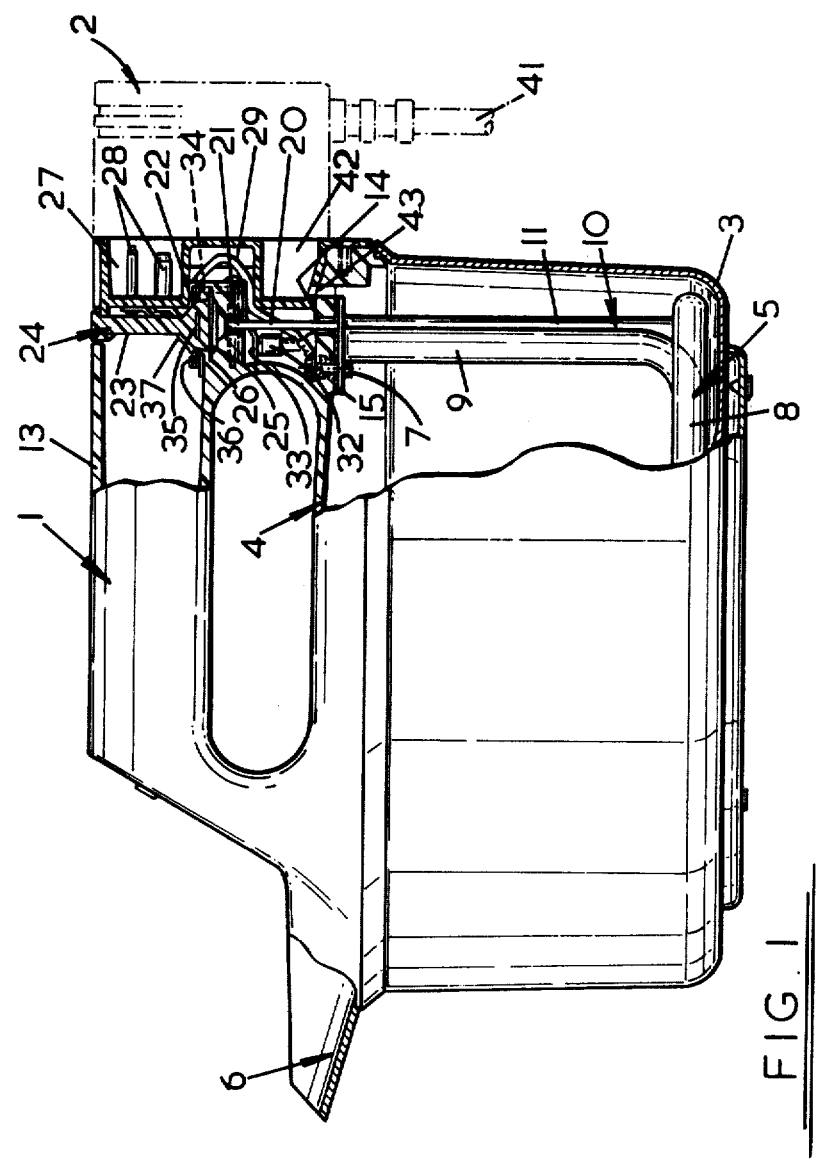
FIG. 1 is a sectional view of an electric kettle adapted for use with a temperature control arrangement according to the present invention.

The kettle 1 for use with the temperature control arrangement 2 according to the present invention comprises a bowl 3 to which is fitted a detachable lid 4. An electric element 5 is connected to the lid 4 so that it is suspended within the bowl 3 when the lid 4 is fitted to the bowl 3. The lid 4 defines a spout 6 through which the bowl can be filled with water.

The element 5 is secured to the lid 4 by means of screws 7 opposite to the spout 6 and comprises a first portion 8 which lies within the bowl 3 and two vertical stems 9 which are attached to the lid 4 by the screws 7. As is described below, the element 5 is electrically connectable to the temperature control arrangement 2 for the supply of power thereto. Within the temperature control arrangement 2 is a thermostat arrangement comprising a cut-out so that the electricity supply to the element 5 is automatically cut off when the water/in the kettle reaches boiling point. However, attached to the element 5 is a second cut-out arrangement 10 whereby the element 5 can be cut off from the electricity supply should the kettle boil dry. This second arrangement 10 will now be described.

Brazed to the first portion 8 of the element 5 adjacent the stems 9 is a vertical tube 11 so that the interior of the tube is water tight. The upper end of the tube 11 communicates with a chamber 12 formed within a handle 13 of the kettle, which is integrally formed with the lid 4, via an aperture 14 in the lid 4. The aperture 14 around the tube 11 is sealed by a gasket 15 which is interposed between the element 5 around the tube 11 and the lid 4, and through which the screws 7 pass. As shown in FIG. 3, within the tube 11 is located a shape memory effect actuator 16 which is coiled in the manner of a spring. The actuator 16 is located at the base of the tube 11 and rests at its lower end on a shoe 17, which is made of a good heat conductor such as copper. A projecting stem 18 of the shoe 17 is arranged to lie axially through the actuator 16 and passes through an aperture 19 formed in a link 20 arranged to rest on the upper end of the actuator 16. The link 20 is formed so that it passes around the projecting stem 18 and then lies axially along the tube 11, passing through the aperture 14 and up into the chamber 12.

Within the chamber 12, the link 20 passes into a bore 21 formed in a portion of the handle 13 defining the chamber 12 and is attached therein to an enlarged head 22 formed at one end of a stem 23 projecting from a push button 24. Around the circumference of the head 22 is attached a leaf spring 25 the rim of which engages in an annular groove 26 formed in an enlarged portion of the bore 21. This spring 25 comprises an over centre spring so that there are two stable positions for the push button 24, one wherein it lies completely within the handle 13 as shown in FIG. 1 and one wherein it projects from the top of the handle 13.

Figure 1A:
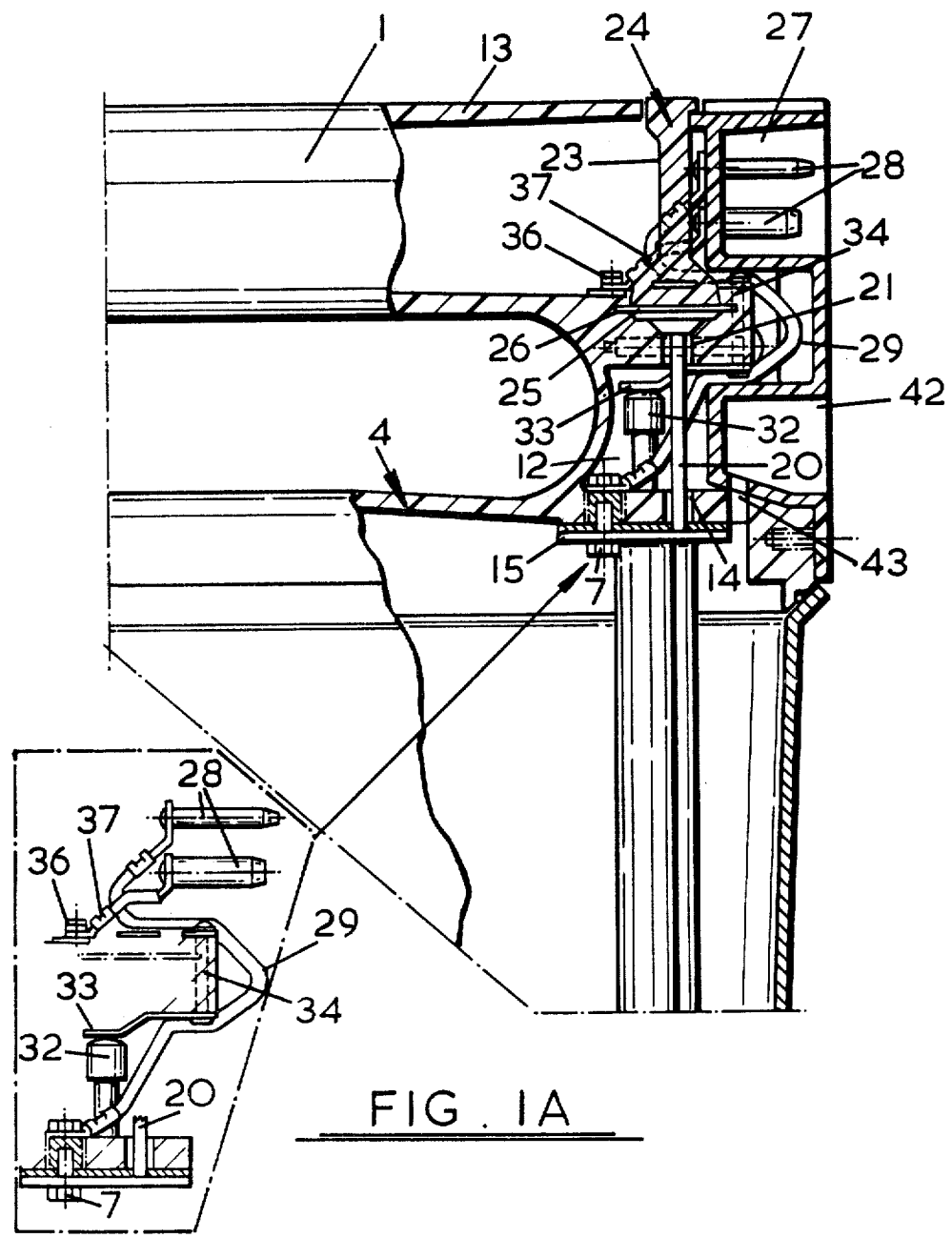
FIG. 1A is an enlargement of a portion of FIG. 1.

As seen most clearly in the enlarged view of FIG. 1A, adjacent the push button 24, the handle 13 is configured to provide a first well 27 in which the temperature control arrangement 2 can fit and into which project three electrical connecting pins 28 from the handle 13 to engage with the arrangement 2. The upper pin 28 comprises an earth pin and is connected internally of the handle 13 via a wire 29 to one of the screws 7 connecting the element 5 to the lid 4. In this way the earth lead for the kettle is in electrical contact with the lid 4 and thereby the bowl 3. The live pin 28 is directly connected via a wire 30 to a contact (not shown) which contacts one electrical connecting post 31 of the element 5 which projects through the lid 4 into the chamber 12. The other electrical connecting post 32 of the element 5, which likewise projects into the chamber 12, is connected via a contact 33 and a screw 34 to a leaf spring 35 which projects from the head 22 of the pushbutton 24. When the push button 24 is in the position shown in FIG. 1, the leaf spring 35 makes electrical contact with a projecting bar 36 which is fixed to the handle 13 and to which the neutral pin 28 is connected via a wire 37. However, when the push button 24 is in its other stable position wherein it projects from the handle 13, the leaf spring 35 is raised above the bar 36 and does not make electrical contact therewith.

It will be appreciated that in use, with the element 5 connected to an electricity supply via the temperature control arrangement 2, as is described below, that should the kettle 1 boil dry, the temperature of the shoe 27 will rise and heat the actuator 16. When the temperature of the actuator 16 is sufficiently high, that is a temperature above the boiling point of water, the actuator 16 will operate by expanding longitudinally. This causes the link 20 to be pushed upwardly in the tube and thereby act to push the head 22 of the push button 24 upwardly against the bias of the spring 25. However, once the spring 25 has passed over centre, it moves into its second stable position and retains the button 24 projecting from the handle 13. In this second position, the electrical contact between the leaf spring 35 and the bar 36 so cutting off the supply of electricity to the element 5.

Thereafter, the kettle 1 can be reset once the temperature therein has cooled and the actuator 16 returned to its original size by depressing the push button 24 to force the spring 25 back into its original stable position, thus re-establishing the electrical contact between the spring 35 and the bar 36.

Turning now to the temperature control arrangement 2, this comprises an outer casing such as a plastics body 38 which is provided with two projecting portions 39 that engage in the handle 13 of the kettle 1. The upper projecting portion 39 can be inserted into the well 27 and is provided with three metallic electrically conducting sleeves 40 in which the pins 28 can locate to connect the pins 28 electrically to a lead 41 attached to the arrangement 2. The lower portion 40 is adapted to engage in a second well 42 formed in the handle 13 beneath the well 27.

The second well 42 defines an aperture 43 in the lid 4 of the kettle, which aperture 43 when the arrangement 2 is plugged into the handle 13 registers with an aperture 44 formed in the portion 40 thereof. Hence, steam from the interior of the bowl 3 can pass through the apertures 43 and 44 into the lower portion 39 of the temperature control arrangement 4. The interior of this portion 39 of the arrangement 2 is sealed off from the rest of the interior of the arrangement substantially by an internal partition 45, thus defining a chamber 46. To permit steam which has entered the chamber 46 to egress therefrom, a second aperture 47 is provided but which does not communicate with the interior of the bowl 3. Within the chamber 46 is located a second shape memory effect actuator 48 which is again coiled in the manner of a spring. Attached to the actuator 48 by a plate 49 is a push rod 50 which lies axially with respect to the actuator 48 and the free end 51 of which passes through a hole 52 formed in the partition 45 to project into the interior of the rest of the arrangement 2. To prevent steam from the chamber 46 passing through the hole 52, a seal 53 is located around the rod 50.

The actuator 48 is adapted to increase in length when heated to the boiling point of water. Hence, in use, when steam passes through the chamber 46 via the apertures 43, 44, and 47 the actuator 48 is heated and operates to thrust the rod 50 through the hole 52 to project further into the adjacent interior of the arrangement 2.

Figure 4:
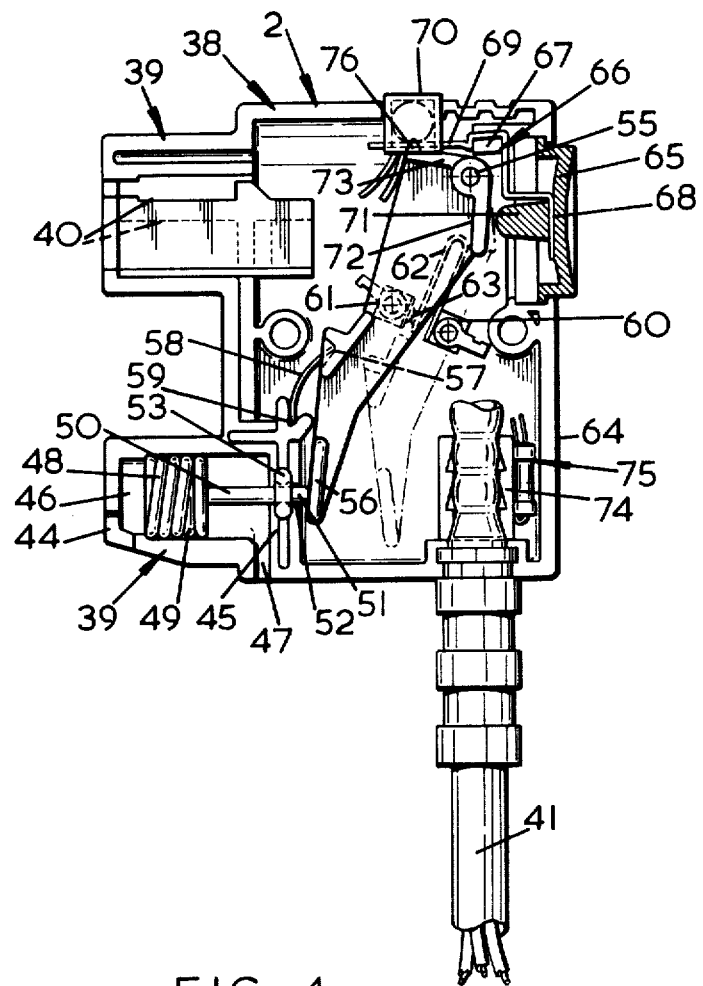
FIG. 4 is a sectional view, to an enlarged scale, of the temperature control arrangement according to the present invention as shown in FIG. 1.

Within the main body 38 of the arrangement 4 is located a lever 54 which is pivotally mounted as at 55 at one end in the upper portion of the body 38. The other end of the lever 54 comprises a foot 56 against which, in a first stable position of the lever 54, the end 51 of the rod 50 bears. Adjacent the foot 56, the lever 54 is provided with a recess 57 in which locates one end of a leaf spring 58, the other end of which locates in a recess 59 formed in the body 38 adjacent the partition 45. This spring 58 is bowed and acts on the lever 54 to retain it in said first position in engagement with the rod 45. However, when the rod 45 thrusts against the lever 54 and pivots same, the spring 58 is altered in position and tends to thrust the lever 54 further from the rod 45 into a second stable position, as shown in dashed lines in FIG. 4.

At the central region of the body are located two connectors 60 and 61 which are interconnected by a leaf spring 62. The leaf spring is U-shaped and one arm is attached to the connector 60 and the other arm bears against a contact 63 of the connector 61. Located adjacent the spring 62 on the lever 54 is a projecting peg (not shown) which, when the lever 54 is moved out of the first position into the second position, strikes the said other arm of the spring 62 and moves out of contact with the contact 63. The bias of the spring 62, therefore, balances the bias of the spring 58 in the second stable position of the lever 54.

In the end face 64 of the body 38 opposite the projecting portions 39 and 40 is a push button 65. This button 103 is biassed outwardly of the body 38 by a leaf spring 66, which is cranked and located in position within the body 38 around a bar 67. Once arm 68 of the spring 66 bears against the button 65 and the other arm 69 of the spring 66 bears against a second push button 70 which is located in the upper face of the body 38 and again biasses the button 70 outwardly of the body 38.

The button 65 is provided internally of the body 38 with a push rod 71 which, when the button 65 is pressed inwardly, strikes a shoe 72 adjacent the pivot point 55 of the lever 54 and forces the lever to move from its second stable position into its first stable position. Likewise, the button 70 when depressed strikes a shoe 73 adjacent the pivot point 55 and forces the lever 54 to move from its first into its second stable position.

The lead 41 enters the socket arrangement at the base of the body 38 and is gripped by an internal sleeve 74. The earth and live wires (not shown) of the lead 41 are connected directly to the appropriate sleeves 40 but the neutral wire is connected to the connector 60 and the connector 61 is then connected to the neutral sleeve 40. Hence, the supply of electricity from the temperature control arrangement 2 depends on the position of the lever 54 which controls whether the leaf spring 62 makes contact between the connectors 60 and 61.

In use, it is convenient to form the push button 70 by a neon light. This can be powered by a circuit arranged in parallel with the supply circuit to the sleeves 40 via a resistor 75. The light can be used to indicate when power is being supplied by the socket arrangement and so that the light is on when the lever 54 is in its first position and off when in its second position, the shoe 73 is provided with a contact 76 connected into the supply circuit for the light which makes a circuit with an adjacent contact (not shown) on the button 70 when the lever 54 in its first position.

When it is desired to use the kettle, the bowl 3 is filled via the spout 6 to the desired level. The element 5 of the kettle is then connected to an electricity supply, such as a mains supply via the temperature control arrangement 2 which is plugged into the handle 13 of the kettle and connected via the lead 41 to the supply. To switch the kettle on, the push button 65 should be pressed to ensure the lever 54 is in its first position and the connectors 60 and 61 in electrical contact. When the water in the kettle boils, the steam in the bowl 3 escapes therefrom in part by passing through the apertures 43 and 44 so that the actuator 47 is heated. When the actuator 47 reaches its predetermined temperature, it expands and forces the push rod 50 to move and strike the foot 56 causing the lever 54 to move from the first into the second position. Hence, the electrical contact between the connectors 60 and 61 is broken and the electrical power supply to the element 5 is cut off. Likewise the neon light is extinguished.

To reset the kettle after the actuator 47 has cooled and returned to its original size, then the button 65 must be pressed to move the lever 54 back ot its first position. Alternatively, if it is desired to switch off the power supply to the element 5 before the boiling point of the water has been reached, then the push button 70 can be pressed to force the lever 54 out of the first position into its second position.

Should the actuator 47 fail or the kettle be connected to the electricity supply without being filled with water, then the actuator 47 will operate in the manner described above to cut off the electricity supply to the element 5.

Hence, it can be seen that in the temperature control arrangement 2 described above, the shape memory effect actuator 48 and switch arrangement formed by the lever 54 and contacts 62, 63 act as a thermostat to switch off the electricity supply to the kettle when the water therein boils. However, the temperature control arrangement described above can be modified in several ways and adapted for use with other appliances such as an electric coffee percolator or an electric saucepan or frying pan.

In a first modification, the control arrangement can be provided in place of or together with the visual alarm formed by the neon light an audio alarm arrangement. For example, a bleeper or whistle could be operated on attainment of the predetermined temperature.

In a second modification, the actuator could be arranged to actuate a switching means whereby instead of cutting off the supply of electricity to the appliance, the current is reduced so that, for example, an electric saucepan could be brought to the boil quickly and the electricity supply thereafter reduced to keep the contents of the saucepan simmering.

It will also be appreciated that whereas the temperature control arrangement described above has made use of a shape memory effect actuator, such an actuator need not be used and could be replaced by any suitable actuator such as a bi-metallic actuator for example.

What is claimed is:

1. A temperature control apparatus for an electrical heating appliance, the heating appliance having an electrical heater therein, comprising: means for attaching the temperature control apparatus of said appliance and for connecting the temperature control apparatus to an electricity supply whereby the electrical heater is supplied with electricity via the temperature control apparatus; thermostat means comprising a heat sensitive actuator and a switch operable by the heat sensitive actuator, the actuator comprising a shape memory effect actuator adapted to operate at a predetermined temperature, and heat transfer means, whereby when the temperature control apparatus is connected to said appliance, transfer of heat can take place from the appliance to the actuator via the heat transfer means so that, in use, the actuator operates the switch to switchably control the supply of electricity to the electrical heater in accordance with a sensed temperature of the appliance.

2. An apparatus as claimed in claim 1, which comprises an outer casing defining a flowpath comprising the heat transfer means through which heated gas from the appliance can travel via holes defined in the appliance and the casing, which holes register when the apparatus is connected to the appliance.

3. An apparatus as claimed in claim 2, in which the heat senstive actuator is located in a chamber within the casing, which chamber forms part of said flowpath.

4. An apparatus as claimed in claim 1, in which the actuator acts on a spring-biased lever having two stable positions whereby on attainment of the predetermined temperature the actuator acts to move the lever from one stable position into the other and cause the lever to operate the switch.

5. An apparatus as claimed in claim 4, in which after operation of the actuator the lever can be manually reset into said one stable position wherein it can be again acted on by the actuator.

6. An apparatus as claimed in claim 4 in which means are provided for the manual movement of the lever from said one stable position into the other to operate the switch and thereby override the actuator.

7. An apparatus as claimed in claim 1, in which the actuator also acts to operate an alarm arrangement.

8. An apparatus as claimed in claim 7, in which the actuator also acts to operate an alarm arrangement, and in which said override means also comprises a light which is adapted to be operated by a switch controlled by the lever, the switch being closed to enable the light to shine when the lever is in said one stable position and being opened to extinguish the light when the lever is moved into said other stable position.

* * * * *